United States Patent
Strauss et al.

(10) Patent No.: US 8,616,466 B2
(45) Date of Patent: Dec. 31, 2013

(54) SPRAYING DEVICE

(76) Inventors: Willi Strauss, Schonaich (DE); Michael Betz, Tamm (DE)

(*) Notice: Subject to any disclaimer, the term of this patent is extended or adjusted under 35 U.S.C. 154(b) by 1050 days.

(21) Appl. No.: 12/580,657

(22) Filed: Oct. 16, 2009

(65) Prior Publication Data

US 2010/0096475 A1  Apr. 22, 2010

Related U.S. Application Data

(60) Provisional application No. 61/106,757, filed on Oct. 20, 2008.

(51) Int. Cl.
*A62C 15/00* (2006.01)
*B05B 9/08* (2006.01)

(52) U.S. Cl.
USPC .......... 239/154; 239/152; 239/175; 239/373; 222/175; 222/383.1; 222/401; 92/187

(58) Field of Classification Search
USPC ................ 239/152, 157, 175, 373; 92/187; 222/383.1–385, 401
See application file for complete search history.

(56) References Cited

U.S. PATENT DOCUMENTS

| | | | | |
|---|---|---|---|---|
| 5,335,853 A | * | 8/1994 | Wirz | 239/142 |
| 5,857,618 A | * | 1/1999 | Restive | 239/1 |
| 6,412,707 B1 | * | 7/2002 | Wirz | 239/154 |

FOREIGN PATENT DOCUMENTS

| | | |
|---|---|---|
| CH | 142248 | 9/1930 |
| CH | 120060 | 5/1957 |
| DE | 8306095 | 9/1983 |
| EP | 1426584 | 6/2004 |

* cited by examiner

*Primary Examiner* — Dinh Q Nguyen
(74) *Attorney, Agent, or Firm* — Brinks Gilson & Lione

(57) ABSTRACT

The disclosure relates to a sprayer with a reservoir for a fluid, such as for a pesticide, with a pump device for pressurizing the fluid, whereby the pump device includes a pump drive, which is movably coupled to a pump piston by means of a pump connecting rod, whereby the pump connecting rod features a first connecting rod part and a second connecting rod part, whereby in order to connect the first connecting rod part and the second connecting rod part, at least one connecting device is provided, by means of which the connecting rod parts can be interlocked in at least two different latching levels.

15 Claims, 4 Drawing Sheets

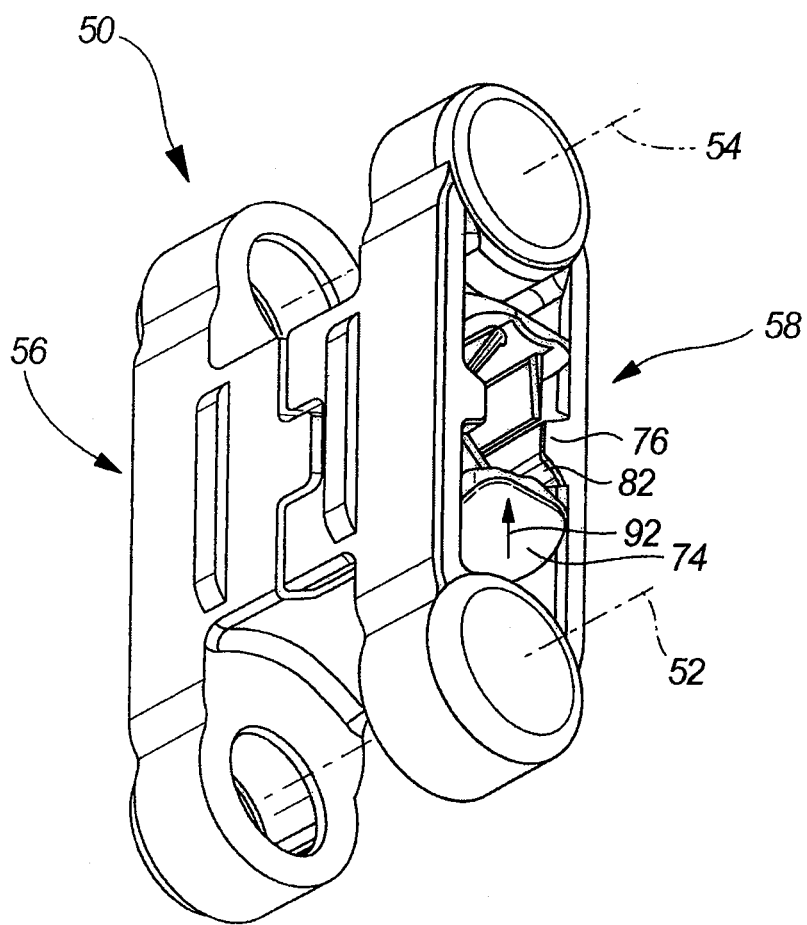
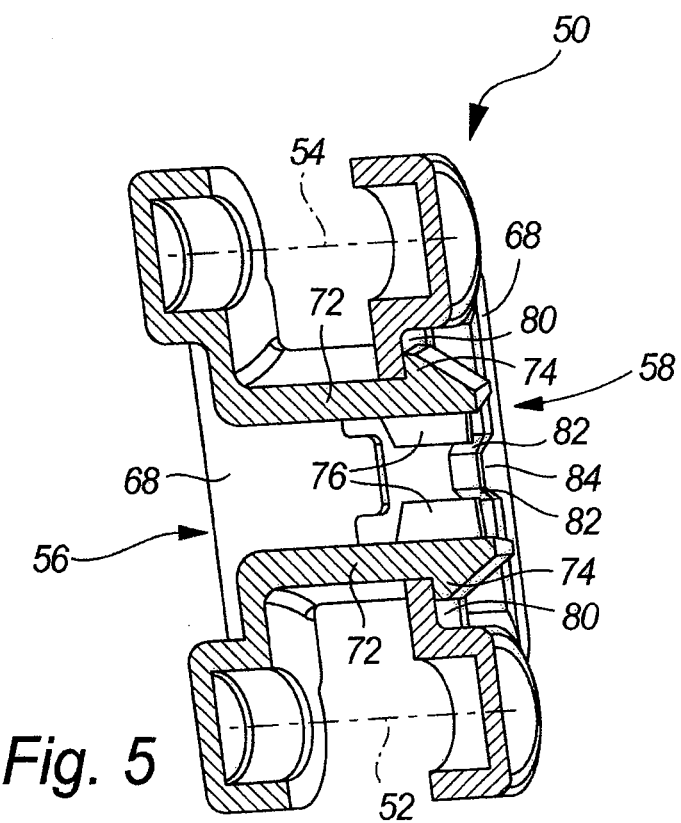
Fig. 4
Fig. 5

SPRAYING DEVICE

CROSS-REFERENCE TO RELATED APPLICATIONS

This application claims the benefit of provisional application Ser. No. 61/106,757, filed on Oct. 20, 2008, the contents of which are incorporated herein by reference in their entirety.

FIELD

The disclosure relates to a sprayer with a reservoir for a fluid.

BACKGROUND

The statements in this section merely provide background information related to the present disclosure and may not constitute prior art.

Sprayers are used, for example, for gardening or in farming. In order to enable homogenous application of a pesticide, pump devices are normally provided, with which the pesticide can be pressurized. The pressurized pesticide can then be discharged from the reservoir, for example, by means of a nozzle or vaporizing device.

Pump devices designed as piston pumps have proved useful for pressurizing a pesticide. They feature a pump drive, whose movement is transmitted by means of a pump connecting rod to a pump piston.

Sprayers can be subjected to great strains, for example impact strains during transport or when shutting off the sprayer. In addition, sprayers should also function reliably with minimal maintenance and extended periods of non-use. Finally, it should be possible to manufacture sprayers at low cost, particularly when a sprayer is also intended for home use.

SUMMARY

Based on this, the present disclosure provides a sprayer with a reservoir for a fluid such as for a pesticide, with a pump device for pressurizing the fluid, whereby the pump device includes a pump drive, which is movably coupled by means of a pump connecting rod to a pump piston. The sprayer can be simply produced and will operate reliably, even with rough handling.

This is accomplished with a sprayer of the type described above in that the pump connecting rod has a first connecting rod part and a second connecting rod part, whereby, in order to connect the first connecting rod part and the second connecting rod part to each other, at least one connecting device is provided, by means of which the connecting rod parts can be interlocked.

Because the pump connecting rod features connecting rod parts that can be interlocked, it can be easily assembled. For example, it is possible to establish a connection to the pump drive and/or the pump piston at the same time as the connecting rod parts are interlocked.

By providing a connecting device by means of which the connecting rod parts can be interlocked in at least two different latching levels, a reliable connection, which is not sensitive to impact, can be established between the connecting rod parts. In this way, unintentional disengagement of the connecting rod parts can be prevented. In this way, disengagement of the connecting rod part from the pump drive and/or the pump piston is also prevented.

In one form the latching levels are at an angle to each other, for example, at a vertical or substantially vertical angle. In this way, disengagement of the connecting rod sections in angular directions is prevented. In this way, disengagement of the connecting rod parts can be prevented, even when they are subjected to very high impact forces.

In one form of the disclosure, it is provided that the connecting device features a latching element that is assigned to a first latching level, and a second latching element that is assigned to a second latching level. In this way, at least one latching element is available for an interlocking in each level.

The first latching element and the second latching element may be arranged on the same connecting rod section, for example, on the first connecting rod part. For example, the first latching element and the second latching element may be designed as in one piece with the first connecting rod part. In this way, a simply constructed connecting device can be created.

The connecting device may have a latching surface that is assigned to the first latching level and a latching surface that is assigned to the second latching level. In this way, a latching surface can be provided for each of the latching levels, so that they can be designed as independent of each other.

The first latching surface and the second latching surface are arranged on the same connecting rod part, for example, on the second connecting rod part. For example, the first latching surface and the second latching surface are designed as integral with the second connecting rod part. In this way, an especially simply constructed connecting device can be provided.

In one form of the disclosure, it is provided that the connecting rod parts can be joined in an assembly direction, and that the assembly direction is vertical or substantially vertical to the one of the latching levels. This enables particularly simple connection of the connecting rod parts. At the same time, protection is provided against disengagement of the connecting rod parts in a direction opposite to the assembly direction.

A possible construction of the connecting device results from the first latching element and the second latching element being arranged on a common latching element bracket. This is designed for example as in one piece with one of the connecting rod parts.

It is possible that the first latching element and the second latching element project in a different direction from the latching element bracket. This enables realization of an interlocking of the connecting rod parts in different latching levels.

When the latching element bracket extends at least substantially parallel to an assembly direction in which the connecting rod parts can be joined, the assembly operation is simplified to the interlocking of the connecting rod parts.

The latching element bracket can be deformed in a direction parallel to the first latching level. In that way, a latching element that is assigned to the first latching level can be connected through deforming of the latching element bracket. This enables a stable construction of the first latching element.

It is furthermore disclosed that the second latching element can be deformed, for example bent, in a direction parallel to the latching level. In this way, a deforming of the second latching element can be superimposed on a deforming of the latching element bracket, so that latching in different latching levels, and in latching levels that are at an angle to each other, is supported.

An abutment surface is provided on the second connecting rod part for deforming the second latching element, said abutment surface inclining in an assembly direction in which the connecting rod parts can be interlocked. In that way, it is possible to join the connecting rod parts in only one assembly direction, and in so doing, not only connect the latching element with a first abutment surface, but also, during the assembly operation, to deform the second latching element in such a way that while maintaining the assembly direction, the second latching element can also be interlocked with a second abutment surface.

The abutment surface may be arranged adjacent to a second abutment surface that is assigned to the second latching surface. In that way, the construction of the connecting device can be further simplified.

If, in a state of the connecting rod parts in a first latching level are assembled with one another, a first latching element is interlocked with a first latching surface, and in a second latching level, a second latching element is interlocked with a second latching surface, whereby the interlocking of the second latching element and the second latching surface is effective as a safety mechanism against disengagement of the first latching element from the first latching surface. The interlocking in the second latching level therefore prevents disengagement of the connection in the first latching level. Disengagement of the connecting rod parts through successive release of the connection between the second latching element and the second latching surface, and a subsequent disengagement of the connection between the first latching element and the first latching surface is then possible. However, because the connecting devices are effective in different latching levels, unintentional disengagement of the connecting rod parts can, in this way, be prevented.

The disclosure also relates to a pump connecting rod for a pump device with a first connecting rod part and a second connecting rod part, whereby, in order to connect the first connecting rod part and the second connecting rod part, at least one connecting device is provided, by means of which the connecting rod parts can be interlocked in at least two different latching levels. Advantages and examples of the disclosed pump connecting rod have already been explained above in connection with the advantages and examples of the disclosed sprayer device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a perspective view of the pump connecting rod according to the principles of the present disclosure in a joined state of the connecting rod parts.

FIG. 5 is a representation corresponding to FIG. 4 in longitudinal section.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
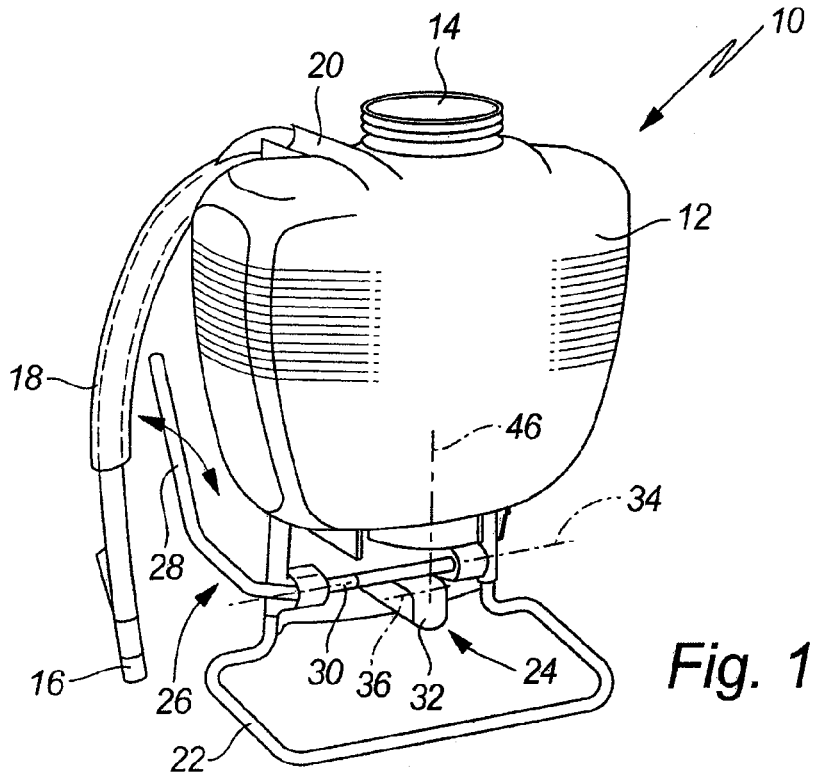
FIG. 1 is a perspective view of a sprayer according to the principles of the present disclosure.

A form of a sprayer referred to with the reference sign 10 is shown in FIG. 1. The sprayer 10 features a reservoir 12 for storing a fluid, in particular, a pesticide. The fluid is poured into the reservoir 12 through an opening 14 in the reservoir 12. The opening 14 can be closed using a lid-section that is not shown in the drawing.

In order to deliver the fluid, the sprayer 10 has a nozzle 16, which is connected by means of a line 18, designed in particular, as a tube, to the reservoir 12.

The sprayer 10 is designed, for example, in the form of a knapsack sprayer. This kind of device may have at least one carrying strap 20.

In order to set the sprayer 10 down safely, and in order to enable comfortable filling of the reservoir 12, the sprayer 10 has a stand 22, by means of which the sprayer 10 can be set down on a surface.

In order to pressurize a fluid contained in the reservoir 12, the sprayer 10 includes a pump device 24. For the purpose of clarity, the components of the pump device 24 are shown in part in FIG. 1 and in part in FIG. 2. The pump device 24 includes a pump drive 26. In the example shown, a pump drive 26 in the form of a manual drive is provided. This includes a manually operated pump lever 28, a pump shaft 30 that is connected to the pump lever 28, and a crank element 32 that is connected to the pump shaft 30. By pivoting the pump lever 28 in the pivot directions designated in FIG. 1 with the number 34, the pump shaft 30 and the crank element 32 that is connected to the pump shaft are pivoted around a shaft axis 34. In this way, a crank element axis 36 running parallel to the shaft axis 34 is also pivoted around the shaft axis 34.

Instead of a manual pump drive 26, a motorized pump drive can be provided. This can, for example, be a motor instead of the pump lever 28, in particular, an electric motor; and instead of the pump shaft 30 and the crank element 32, there can be a crankshaft.

Figure 2:
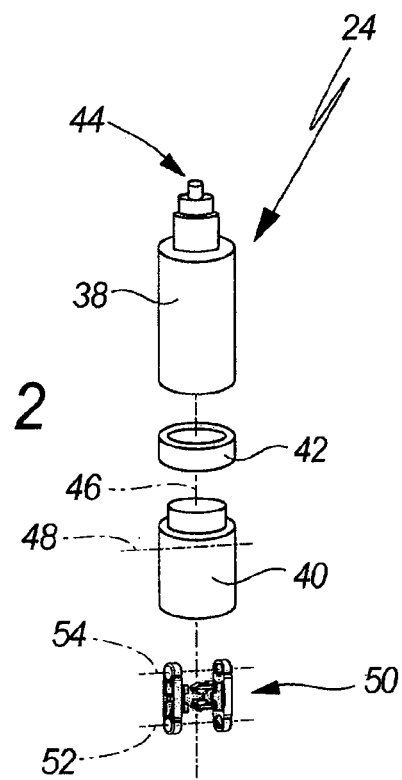
FIG. 2 is an exploded view of a pump device for a sprayer according to the principles of the present disclosure.
Figure 3:
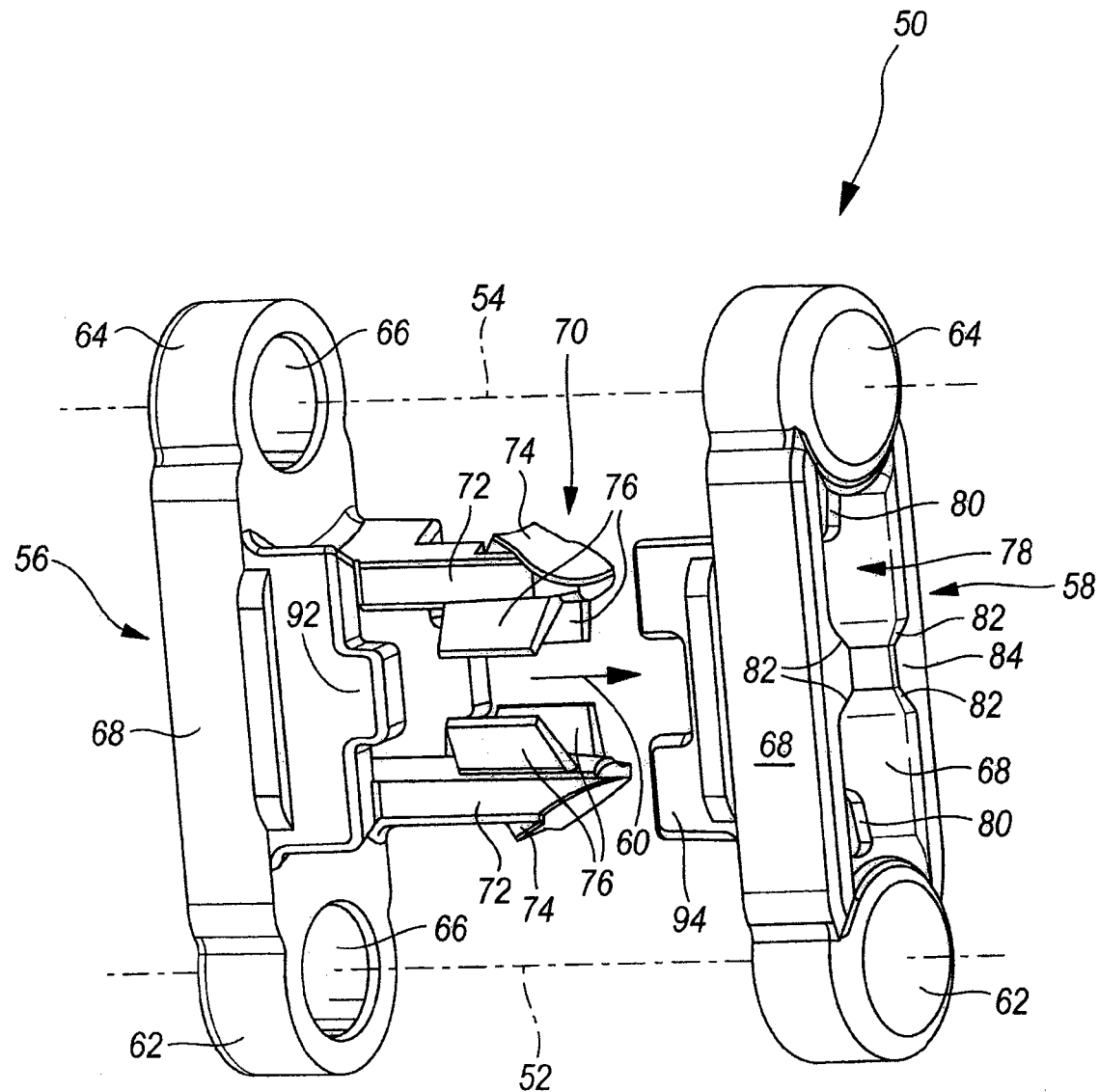
FIG. 3 is a perspective view of a pump connecting rod of the pump device according to the principles of the present disclosure, whereby the pump connecting rod is shown in a non-joined state of a first connecting rod part and a second connecting rod part.

In addition to the pump drive 26, the pump device 24 includes additional components shown in FIG. 2. In detail, the pump device 24 includes a cylinder 38 and a pump piston 40 that is disposed inside it in a longitudinally displaceable manner. The pump piston 40 is sealed relative to the cylinder 38 by means of a piston lining 42. On the side of the cylinder 38 facing away from the piston 40, a pump valve 44 is arranged. The cylinder 38 and the piston 40 are arranged along a pump axis 46 that runs vertically and offset to the shaft axis 34. The pump piston 40 displays a piston axis 48 that extends vertically to the pump axis 46, and which may run parallel to the crankshaft axis 36.

In order to movably couple the crank element axis 36 of the crank element 32 and the piston axis 48 of the pump piston 40, the pump device 24 includes a connecting rod 50. The connecting rod 50 has a first bearing shaft 52 and second bearing shaft 54 that may be disposed parallel to it. In an assembled state of the pump device 24, the first bearing shaft 52 is collinear to the crank element axis 36, so that the crank element 32 and the connecting rod 50 are rotationally linked to each other. In addition, in an assembled state of the pump device 24, the second bearing shaft 54 is collinear with the piston axis 48, so that the pump connecting rod 50 and the pump piston 40 are rotationally connected. In this way, a pivoting movement of the pump lever 28 can be converted to a straight line movement of the pump piston 40 along the pump axis 46. Here, the pump valve 44 is open during a compression stroke and closed during a return stroke, so that the fluid contained in the reservoir 12 can be pressurized.

The pump connecting rod 50 will be described in more detail below with reference to the FIGS. 3 to 6. The pump connecting rod 50 has a first connecting rod part 56 and a second connecting rod part 58. The connecting rod parts 56 and 58 can be joined in an assembly direction designed as 60 (see FIGS. 3 and 6) and can be made of plastic.

The connecting rod parts 56 and 58 each have a first bearing section 62 and a second bearing section 64. The bearing sections 62 define the first bearing axis 52; the bearing sections 64 define the second bearing axis 54. For example, the bearing sections 62, 64 enclose the bearing bushes 66, which interact with the corresponding bearing bolts, which are provided, on the one hand on the crank element axis 36 of the crank element 32, and on the other on the piston axis 48 of the pump piston 40.

The bearing sections 62, 64 are connected to each other by means of bar-shaped connecting rod segments 68.

In order to connect the connecting rod parts 56 and 58, the pump connecting rod 50 includes a connecting device 70.

The first connecting rod part 56 features at least one or two latching element brackets 72. The latching element brackets 72 extend in a direction parallel to the assembly direction 60. The latching element brackets 72 point in the direction of the second connecting rod part 58. At the open end of a latching element bracket 72, or adjacent to it, at least one first latching element 74 is arranged, and at least one second latching element 76. For example, on one latching element bracket 72, one first latching element 74 and two second latching elements 76 are provided. The latching elements 74 and 76 extend in different directions originating from the latching element bracket 72.

The first latching element 74 may be designed as a dimensionally stable latching lug. For example, the at least one second latching element 76 is constructed in the form a latching pin, which has less dimensional stability than the first latching element 74.

The connecting rod segments 68 of the second connecting rod part 58 delimit a connecting rod opening 78, into which the latching elements 74, 76 can be inserted. The delimitation of the connecting rod opening 78 includes at least one latching surface 80 that extends vertically, or substantially vertically, to the assembly direction 60. In addition, the connecting rod opening 78 is delimited by at least one second latching surface 82 that extents parallel or substantially parallel to the assembly direction 60. The latching surfaces 82 are provided on a projection of material 84 which, originating from a connecting rod section segment 68, extends inward in the direction of an opposite connecting rod segment 68 of the same connecting rod part.

When connecting rod parts 56 and 58 are interlocked, the first latching elements 74 interact with the first latching surfaces 80. Furthermore, when the connecting rod parts 56 and 58 are interlocked, the second latching elements 76 interact with the second latching surfaces 82.

Here, the first latching surfaces 80 define, in each case, a first latching level 86. The first latching level 86 extends vertically, or substantially vertically to the assembly direction 60.

The second latching surfaces 82 extend in each case within a second latching level 88. The latching levels 86 and 88 are at angles to each other, in particular, vertical to each other.

During assembling of the first connecting rod part 56 to the second connecting rod part 58, the latching element brackets 72 are deformed in a direction parallel to the first latching level 86, so that the first latching elements 74 can interlockingly engage the first latching surfaces 80. During deforming of the latching element bracket 72, which is seen particularly well in FIG. 6, the second latching elements 76 are also moved from their non-deformed position (cf. FIG. 3) into a deformed position (cf. FIG. 6). For this purpose, a stop face 90 is provided that extends at an angle relative to the direction of assembly 60. With the aid of the stop face 90, the second latching elements 76, during movement of the first latching elements 74 from their non-interlocking to their interlocking state, are deformed in a direction parallel to the first latching level 80, so that the second latching element 76 is initially in a position in which it does not engage the second latching surface 82. As soon as the latching element brackets 72 have been moved far enough into the opening 78 so that they deform back into their original shape in a spring-elastic manner, and the first latching elements 74 engage the first latching surfaces 80, the second latching elements 76 also are also deformed in a spring-elastic manner and interlockingly engage the second latching surfaces 82.

In order to release the connecting rod parts 56 and 58 from each other, the first latching elements 74 have to be moved in a release direction designated in FIG. 4, with the reference signs 92. However, in this direction, movement of the first latching element 74 is blocked, as the second latching elements 76 are interlockingly engaged with the second latching surfaces 82. In this way, the interlocking of the second latching element 76 and the second latching surface 82 acts as a safety mechanism against a release of the first latching element 74 from the first latching surface 80.

With the aid of the connecting device 70, a reliable connection can be established in a simple manner between the connecting rod parts 56, 58. At the same time, with the inclusion of bearing bolts belonging to the crank element 32, or as the case may be, the pump piston 40; a rotary joint can be established with the crank element 32, or as the case may be, the pump piston 40.

In order to further improve the stability of the connection between the connecting rod parts 56 and 58, positive-fit elements 92, or as the case may be, 94 can be provided, which in an interlocked state of the connecting rod parts 56, 58, are engaged in a form-fitting manner.

Figure 6:
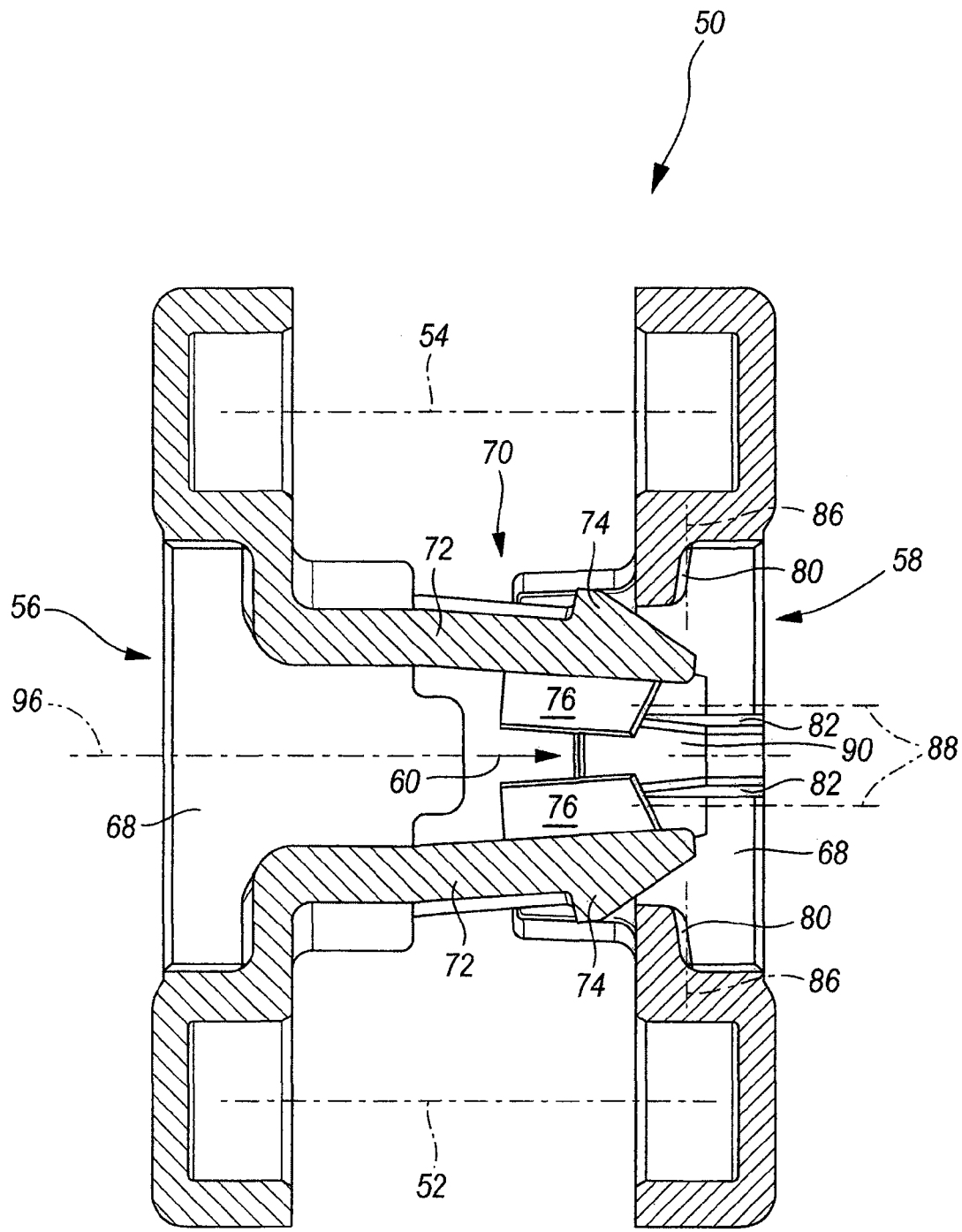
FIG. 6 is a longitudinal section of the pump connecting rod according to the principles of the present disclosure and shown in FIG. 3 during the assembly of the connecting rod parts.

The pump connecting rod 50 described above features two symmetry planes. A first symmetry plane is spanned by the two bearing axes 52 and 54; a second symmetry plane runs vertically to it and parallel to the assembly direction 60. In FIG. 6, this second symmetry plane is designed with the reference sign 96.

It should be noted that the disclosure is not limited to the forms described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A sprayer with a reservoir for a fluid, with a pump device for pressurizing the fluid, whereby the pump device includes a pump drive, which is movably coupled by means of a pump connecting rod to a pump piston, wherein the pump connecting rod comprises a first pump connecting rod part, a second pump connecting rod part, and at least one connecting device, wherein the connecting rod parts are latched together in at least two different latching planes by the at least one connecting device,
 wherein the connecting device is a first latching element assigned to a first latching level and a second latching element assigned to a second latching level,
 wherein the first latching element and the second latching element are arranged on a common latching element bracket, and
 wherein the latching element bracket extends at least substantially parallel to an assembly direction, in which the connecting rod parts can be joined.

2. The sprayer according to claim 1, wherein the fluid is a pesticide.

3. The sprayer, according to claim 1, wherein the latching levels are at an angle to each other, at a vertical or substantially vertical angle.

4. The sprayer, according to claim 1, wherein the first latching element and the second latching element are arranged on the first connecting rod part.

5. The sprayer, according to claim 1, wherein the connecting device features a first latching surface that is assigned to the first latching level and a second latching surface that is assigned to the second latching level.

6. The sprayer, according to claim 5, wherein the first latching surface and the second latching surface are arranged on the second connecting rod part.

7. The sprayer, according to claim 1, wherein the connecting rod parts can be joined in an assembly direction, and that the assembly direction is vertical or substantially vertical to one of the latching levels.

8. The sprayer, according to claim 1, wherein the first latching element and the second latching element project in different directions from the latching element bracket.

9. The sprayer, according to claim 1, wherein the latching element bracket can be deformed in a direction parallel to the first latching level.

10. The sprayer, according to claim 1, wherein the second latching element can be deformed in a direction that is parallel to the first latching level.

11. The sprayer, according to claim 1, wherein when the connecting rod parts are interlocked in a first latching level, a first latching element is interlocked with a first latching surface, and in a second latching level, a second latching element is interlocked with a second latching surface, whereby the interlocking of the second latching element and the second latching surface is effective as a safety mechanism against a disengagement of the first latching element from the first latching level.

12. A sprayer with a reservoir for a fluid, with a pump device for pressurizing the fluid, whereby the pump device includes a pump drive, which is movably coupled by means of a pump connecting rod to a pump piston, wherein the pump connecting rod comprises a first pump connecting rod part, a second pump connecting rod part, and at least one connecting device, wherein the connecting rod parts are latched together in at least two different latching planes by the at least one connecting device,
 wherein the connecting device is a first latching element assigned to a first latching level and a second latching element assigned to a second latching level,
 wherein the first latching element and the second latching element are arranged on a common latching element bracket,
 wherein the first latching element and the second latching element project in different directions from the latching element bracket, and
 wherein the latching element bracket extends at least substantially parallel to an assembly direction, in which the connecting rod parts can be joined.

13. The sprayer, according to claim 12, wherein the latching element bracket can be deformed in a direction parallel to the first latching level.

14. A sprayer with a reservoir for a fluid, with a pump device for pressurizing the fluid, whereby the pump device includes a pump drive, which is movably coupled by means of a pump connecting rod to a pump piston, wherein the pump connecting rod comprises a first pump connecting rod part, a second pump connecting rod part, and at least one connecting device, wherein the connecting rod parts are latched together in at least two different latching planes by the at least one connecting device,
 wherein the connecting device is a first latching element assigned to a first latching level and a second latching element assigned to a second latching level,
 wherein in order to deform the second latching element, a stop face is provided on the second connecting rod part, which inclines in an assembly direction in which the connecting rod parts can be joined.

15. The sprayer, according to claim 14, wherein the abutment surface is arranged adjacent to a second latching surface that is assigned to the second latching level.

* * * * *